April 2, 1968      W. R. HRUDEN      3,376,166

DEFERRED ACTION DRY CELL BATTERY STRUCTURE

Filed Sept. 28, 1964

INVENTOR.
WAYNE RICHARD HRUDEN
BY *Whittemore*
*Hulbert & Belknap*
ATTORNEYS

United States Patent Office 3,376,166
Patented Apr. 2, 1968

3,376,166
DEFERRED ACTION DRY CELL
BATTERY STRUCTURE
Wayne Richard Hruden, Windsor, Ontario, Canada, assignor to Hruden Industries, Inc., Ann Arbor, Mich., a corporation of Michigan
Filed Sept. 28, 1964, Ser. No. 399,569
6 Claims. (Cl. 136—90)

The invention relates to batteries and refers more specifically to improved dry cell battery structure including means for activating the battery at any selected time to start the battery shelf life.

In the past batteries, such as flashlight batteries, have usually had a definite shelf life from the date of manufacture and have therefore had to be replaced periodically in certain installations such as in bomb shelters and armed services depots. Even batteries on dealers' shelves have sometimes had to be replaced with new batteries due to deterioration of the batteries in storage. This deterioration of batteries in storage becomes an important cost item in many situations.

Prior attempts to provide batteries having no shelf life have been unsuccessful for many reasons including slow production of electric energy on activation and use of a dangerous liquid electrolyte therein. Further, wherein batteries having no shelf life have been produced in the past they have been complicated, expensive or difficult to activate.

It is therefore an object of the present invention to provide improved dry cell battery construction.

Another object is to provide dry cell battery construction which has no predetermined shelf life.

Another object is to provide dry cell battery construction having water or electrolyte fluid as the activating fluid.

Another object is to provide dry cell battery construction which may be activated at any selected time to start the battery shelf life and which when activated produces an electric signal substantially immediately.

Another object is to provide dry cell battery construction including means to prevent accidental activation thereof.

Another object is to provide dry cell battery construction which is particularly easy to activate.

Another object is to provide dry cell battery construction which is simple in construction, economical to manufacture and efficient in use.

Other objects and features of the invention will become apparent as the description proceeds especially when taken in conjunction with the accompanying drawings illustrating a preferred embodiment of the invention, wherein.

With particular reference to the figures of the drawings one embodiment of the present invention will now be considered in detail.

Figure 1:
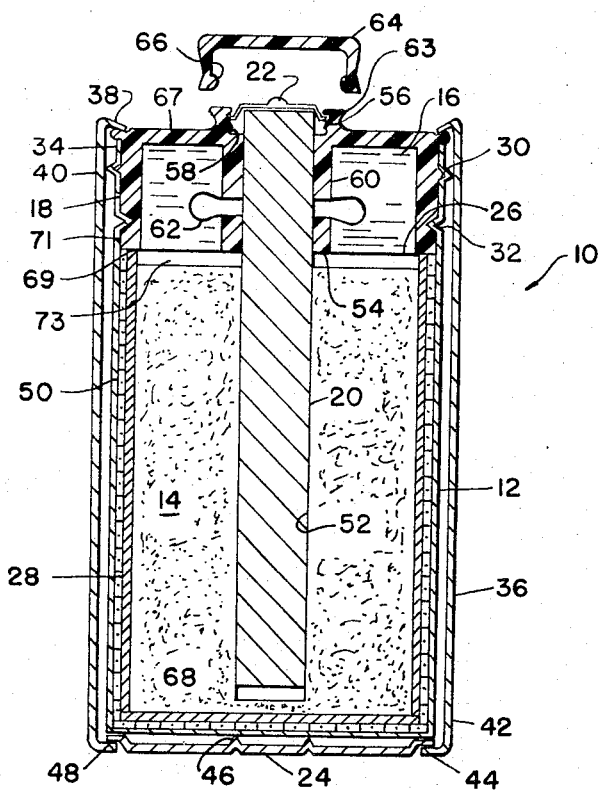
FIGURE 1 is a longitudinal section view of dry cell battery structure constructed in accordance with the invention.

As shown best in FIGURE 1 the dry cell battery structure 10 includes the zinc can 12 which forms the negative electrode of the battery, the bobbin 14 which forms the positive electrode of the battery and the activating fluid electrolyte solvent 16 in the electrolyte solvent chamber 18. The bobbin 14 is in electrical contact with the carbon rod 20 and the anode cap 22 to provide a positive output electrical contact for the battery 10 while the steel cathode 24 is provided in contact with the zinc can 12 to provide a negative output electrical contact for the battery 10.

Prior to use the battery 10 is stored with the electrolyte solvent 16 in the chamber 18. When it is desired to start the shelf life of the battery 10 the carbon rod 20 is depressed to break the trigger membrane 26 which forms a part of the solvent chamber to permit the electrolyte solvent to dissolve the electrolyte solute with which the absorbent material such as paper 28 between the bobbin 14 and zinc can 12 is impregnated to start the electrical action of the battery 10.

More specifically, the zinc can 12 is the negative element of the battery 10 as previously indicated and may be thicker than the usual zinc can to increase the active life of the battery since the zinc can is the element of the battery which deteriorates in use. The zinc can is provided with an inner and an outer annular groove 30 and 32 about the open end 34 thereof by which the chamber 18 is secured thereto. An adhesive may be used between the solvent chamber 18 and the zinc can 12 to assure a seal therebetween as desired.

As shown in FIGURE 1 the polyethylene lined steel jacket 36 surrounds the zinc can 12. The jacket 36 protects the battery 10, prevents external corrosion thereof, serves as a decorative label and retains the electrolyte solvent or other liquid within the confines of the battery 10 should the zinc can leak. Jacket 36 is held in place on the solvent chamber by the radially inwardly extending flange 38 at the upper end 40 thereof. The lower end 42 of the jacket 36 is also provided with a radially inwardly extending annular flange 44. The annular flange 44 serves to hold the steel cathode 24 which may be gold plated for better electrical conductivity in contact with the zinc can 12 which, as indicated above, is the negative electrode of the dry cell 10. The steel cathode 24 is provided with an annular V-shaped contact ring 46 and the annular offset sealing ring 48 at the outer periphery thereof as shown best in FIGURE 1. The seal between the jacket 36, the steel cathode 24 and the chamber 18 may be by conventional means such as a plastic adhesive or thermal seal to insure retention of liquid within the battery 10.

The inner surface of the zinc can 12 is provided with a flexible membrane of for example a starchy material such as a Moorehouse membrane 50 (a starch film rendered flexible by the addition of glycerol) or a film of methyl cellulose. The Moorehouse membrane 50 serves as an ion transfer medium between the zinc can negative electrode 12 and the bobbin 14.

The absorbent paper 28 is impregnated with an electrolyte consisting of ammonium chloride and zinc chloride in approximately a three to one ratio together with a trace of mercuric chloride and is positioned in the zinc can 12 interiorly of the Moorehouse membrane 50. On activation of battery 10 the absorbent paper 28 carries the electrolyte solvent from the liquid chamber to between the electrodes 12 and 14. The electrolyte solute between the positive and negative electrodes dissolves in the electrolyte solvent and forms the electrolyte solution which then activates the battery 10.

If the electrolyte solvent 16 is distilled water the proportions of the electrolyte solute contained in the absorbent paper 28 may be composed approximately of:

| | Percent |
|---|---|
| NH₄Cl (ammonium chloride) | 75 |
| ZnCl₂ (zinc chloride) | 25 |

The bobbin 14 which has previously been indicated as the positive electrode is a relatively porous mixture of acetylene black, ammonium chloride, zinc chloride and manganese dioxide. The bobbin 14 serves as both a positive electrode and a depolarizer. In addition the bobbin may act to some extent to retain a portion of the cell electrolyte. As shown in FIGURE 1 the bobbin 14 fills the lower portion of the zinc can 12 and is provided with an axially extending recess 52 into which the carbon rod 20 is inserted.

The carbon rod 20 is rigidly secured to the rod sleeve 54 for vertical movement therewith on movement of the cathode cap 22 between the upper and lower grooves 56 and 58 in the neck 60 of the chamber 18. The carbon rod 20 is the electrical contact for the positive electrode of the battery and is porous enough to permit the escape of gases accumulating in the cell of the battery but does not permit leakage of the electrolyte or the solvent fluid. Although carbon may generally be used rod 20 may be made of any suitably porous material, such as polyethylene, and may be plated with a noble metal, such as platinum, to increase conductivity thereof. The rod sleeve 54 is constructed of a polyolefin, such as polyethylene, and serves to mechanically connect the bellow film 62 and the trigger membrane 26.

The electrolyte solvent chamber 18 is provided with the neck portion 60 having upper and lower ends which besides receiving the cathode cap 22 and securely holding it in upper and lower positions, depending upon whether the battery 10 is in an activated or inactivated stage, provides a retaining flange 63 for the cathode battery cover 64. The anode battery cover 64 is constructed as shown in FIGURE 1 and is provided with a complementary annular sealing lip 66. The lower end of the neck 60 is connected to the bellow film 62 as shown best in FIGURE 1. The upper end of the neck 60 is connected to the upper end of the outer cylindrical portion 71 of the chamber 18 by the radially extending annular portion 67 extending between the upper end of the neck 60 and the upper end of the cylindrical portion 71.

The bellows film 62 which may be a polyethylene film of desired thickness is secured to both the lower end of neck 60 and the upper end of rod sleeve 54 and permits axial movement of the rod sleeve 54 with respect to the neck 60 on depression of the anode cap 22 to seat in its lower groove 58 and consequent downward movement of the carbon rod 20 into the chamber 68 left for this purpose at the bottom of the recess 52 when the anode cap 22 is in its upper groove 56.

The trigger membrane 26 may be an extremely thin polyethylene film which is tensely stretched across the area between the lower end of the rod sleeve 54 and the lower end 69 of the outer cylindrical portion 71 of the chamber 18 as shown in FIGURE 1.

Thus, in operation, with the dry cell battery 10 constructed as shown in FIGURE 1, the dry cell 10 may be stored for any unlimited period of time with the distilled water electrolyte solvent 16 maintained within the chamber 18 due to the unruptured trigger membrane 26 and the position of the cathode cap 22 in the groove 56. The cap 64 may be positioned on the neck 60 of the chamber 18 during this time to prevent accidental activation of the battery 10.

When it is desired to activate the dry cell 10 and start the shelf life thereof the cap 64 is removed therefrom and the cathode cap 22 is pressed down to move the carbon rod 20 and rod sleeve 54 down. The membrane 26 is thus ruptured and the distilled water electrolyte solvent 16 is quickly absorbed into the paper 28 between the bobbin 14 and Moorehouse membrane 50. The distilled water quickly dissolves the electrolyte solute chemicals with which the absorbent paper 28 between the zinc can 12 and the bobbin 14 is impregnated so that an electrical signal is produced between the can 12 and bobbin 14 substantially immediately. An electrical signal from the battery 10 may then be obtained from the steel anode 24 and the cathode cap 22 in the usual manner.

The chamber 73 between the bobbin 14 and solvent chamber 18 is provided for expansion of the bobbin. Chamber 73 may be considerably smaller than the expansion chamber of the usual dry cell battery since the bobbin 14 may expand into the solvent chamber 18 through the ruptured trigger membrane 26.

Figure 2:
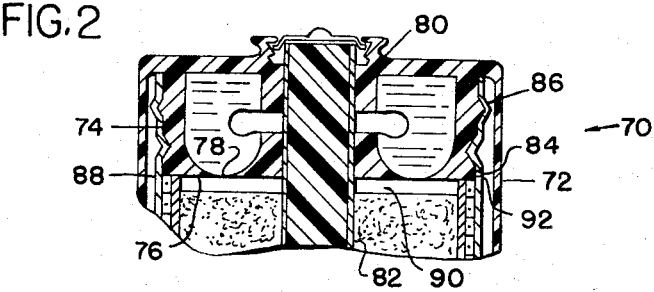
FIGURE 2 is a partial longitudinal section view of a modification of the battery structure illustrated in FIGURE 1.

The modified battery structure 70 illustrated in FIGURE 2 is similar to the battery structure 10 illustrated in FIGURE 1. However, the outer jacket 72 has been made integral with the solvent chamber 74 and both are constructed of a polyolefin plastic, such as polyethylene. Additionally in the modified battery structure 70 the trigger membrane 76 is tapered gradually to an annular, very thin portion 78 which will be broken on depression of the rod 80 which, as indicated above, may be polyethylene plastic having a noble metal coating of for example gold or platinum 82. An opening 84 is provided extending transversely through the wall 86 of the zinc can 88 through which air trapped in chamber 90 may escape during assembly to prevent premature rupturing of the trigger membrane 76. The opening 84 is closed on assembly of the solvent chamber 74 with the zinc can 88 by the plug 92 on the solvent chamber 74.

While one embodiment of the present invention and a modification thereof have been considered in detail, it is to be understood that other embodiments and modifications of the invention are contemplated. Thus for example the fluid in chamber 18 may be an electrolyte with the absorbent material not impregnated with an electrolyte solute if desired. It is the intention to include all modifications and embodiments of the invention as are defined by the appended claims within the scope of the invention.

I claim:

1. Battery structure comprising an outer zinc can negative electrode having a top portion, an inner bobbin positive electrode of acetylene black, ammonium chloride, zinc chloride and manganese dioxide filling the lower portion of the zinc can negative electrode and having an axially extending recess therein, a layer of absorbent paper impregnated with an electrolyte solution between the negative and positive electrodes, an electrical contact rod having an upper end portion and extending into the recess in the bobbin and axially upwardly of the bobbin above the top of the zinc can, an electrolyte solvent chamber positioned between the top portion of the zinc can and the upper end portion of the rod above the bobbin, said chamber comprising an outer cylindrical portion having upper and lower ends, an inner cylindrical neck portion having upper and lower ends and a radially extending portion between the upper ends of the outer cylindrical portion and the neck portion forming an annular portion of the top of the battery structure, a rod sleeve secured to the rod in spaced relation to the top of the bobbin and immediately below the neck portion of the chamber having an upper and lower end, an annular bellows member between the neck portion of the chamber and the rod sleeve and a trigger membrane extending between the lower end of the rod sleeve and the lower end of the outer cylindrical portion of the chamber, a liquid electrolyte solvent in said chamber, an anode cap positioned over the top of the rod and held in position by the neck portion of the chamber, an outer jacket over said zinc can radially exteriorly thereof and a negative electrode over the bottom of the zinc can held in position by the outer jacket.

2. Structure as set forth in claim 1 wherein the electrolyte solvent is distilled water.

3. Structure as set forth in claim 1 wherein the electric contact rod is carbon.

4. Structure as set forth in claim 1 wherein the electric contact rod is a polyolefin plastic plated with a noble metal.

5. Battery structure comprising an outer cylindrical can negative electrode, an inner bobbin positive electrode in the lower portion of the can having an axially extending recess therein, a layer of absorbent paper between the positive and negative electrodes, an electrical contact rod extending into the recess in the bobbin and upwardly out of the bobbin, a chamber above the bobbin and between the upper end of the can and rod including a radially outer cylindrical portion secured to the upper end of the can, a radially inner cylindrical neck portion surrounding the upper end of said rod, an annular portion connecting the upper ends of the cylindrical portions, a rod sleeve secured to the rod and in spaced relation to the top of the bobbin, an annular bellows member between the neck portion and rod sleeve and means extending between the rod sleeve and outer cylindrical portion of the chamber separable to open said chamber on downward movement of the rod sleeve relative to the outer cylindrical member and liquid in said chamber for providing an electrolyte between the electrodes in conjunction with the absorbent material on downward movement of the rod to activate the battery structure.

6. Structure as set forth in claim 5 and further including a cap removably secured to the annular portion of the chamber and extending over the upper end of the rod to prevent accidental downward movement of the rod.

References Cited
UNITED STATES PATENTS

| | | | |
|---|---|---|---|
| 2,852,592 | 9/1958 | Salauze | 136—90 |
| 2,992,289 | 7/1961 | Meyers | 136—153 X |
| 3,046,786 | 7/1962 | Tessem | 136—90 X |
| 3,139,356 | 6/1964 | Tsuji | 136—90 |
| 3,228,801 | 1/1966 | Snyder | 136—90 X |
| 3,236,697 | 2/1966 | Amiet et al. | 136—90 X |

WINSTON A. DOUGLAS, *Primary Examiner.*

B. J. OHLENDORF, *Assistant Examiner.*